United States Patent [19]

Klotz et al.

[11] 4,325,785
[45] Apr. 20, 1982

[54] METHOD AND APPARATUS FOR MEASURING THE REACTIVITY OF A SPENT FUEL ASSEMBLY

[75] Inventors: Robert J. Klotz, Simsbury; Donald W. Stephen, West Suffield, both of Conn.

[73] Assignee: Combustion Engineering, Inc., Windsor, Conn.

[21] Appl. No.: 40,266

[22] Filed: May 18, 1979

[51] Int. Cl.³ .............................................. G21L 17/00
[52] U.S. Cl. .................................... 376/154; 376/254; 376/257
[58] Field of Search ................ 176/19 R, 30; 250/507

[56] References Cited

U.S. PATENT DOCUMENTS

| | | | |
|---|---|---|---|
| 2,936,274 | 5/1960 | Dessauer | 176/19 R |
| 3,519,534 | 7/1970 | Ghilardotti et al. | 176/19 R |
| 3,636,353 | 1/1972 | Untermyer | 176/19 R |
| 3,650,894 | 3/1972 | Rausch et al. | 176/19 R |
| 3,755,675 | 8/1973 | Stephan et al. | 176/19 R |
| 3,932,211 | 1/1976 | Loving | 176/19 R |
| 4,044,267 | 8/1977 | Bevilacqua | 250/518 |
| 4,097,330 | 6/1978 | Neissel et al. | 176/19 R |
| 4,172,760 | 10/1979 | Ballard et al. | 176/19 R |
| 4,208,247 | 6/1980 | Impink | 176/19 R |

FOREIGN PATENT DOCUMENTS 745485 2/1970 Belgium ............................ 176/19 R

OTHER PUBLICATIONS

Trans. Am. Nuc. Soc., vol. 28, pp. 128–129, (6/78), Ragen et al., (I).
Trans. Am. Nuc. Soc., vol. 23, pp. 95–96, (1976), Ragen et al., (II).

*Primary Examiner*—Sal Cangialosi
*Attorney, Agent, or Firm*—L. James Ristas

[57] ABSTRACT

An accurate determination of whether the reactivity of individual spent fuel assemblies exceeds a threshold value is made while each assembly is being transferred from the reactor core to the fuel storage rack. The reactivity of each spent assembly is compared with that of a standard assembly by comparing the subcritical multiplication resulting from insertion of a neutron source into the assemblies. The measuring apparatus preferably exteriorly resembles a control element assembly wherein one control element finger containing the neutron source is yoked to another finger containing a neutron detector. The fingers are simultaneously inserted into a standard assembly having a known reactivity and subcritical multiplication, and the resulting flux signal is recorded. Thereafter spent assemblies are sequentially measured to assure that no assembly having a subcritical multiplication greater than that of the standard is ever placed into the storage rack.

10 Claims, 4 Drawing Figures

METHOD AND APPARATUS FOR MEASURING THE REACTIVITY OF A SPENT FUEL ASSEMBLY

BACKGROUND OF THE INVENTION

This invention relates to measuring the reactivity of individual nuclear fuel assemblies, and more particularly to determining whether the reactivity of an assembly is greater than a maximum permissible reactivity.

During the fuel cycle of a modern light-water reactor, spent fuel assemblies that have been removed from the reactor are typically placed in a fuel storage rack in a large water pool until certain highly radioactive but short-lived isotopes are exhausted. Although the short-lived isotopes may die out within a few years, the assemblies contain sufficient residual amounts of long-lived fissile and fertile isotopes such as U-238, PU-239, U-235 to pose a danger that the storage assemblies will "go critical" if minimum separation and orientation limits are not maintained in the rack. When existing nuclear power plants were constructed, it was believed that spent fuel would remain in such on site storage racks for three to six months. Accordingly, the racks were designed to accommodate, for example, fuel assemblies equivalent to one and one-third reactor cores.

In recent years, regulatory policies have made it virtually impossible to ship spent assemblies so the need has arisen to store more assemblies in the fuel storage pool than was originally planned. Increasing the number of assemblies stored in a given area decreases the spacing and increases the nuclear interaction between assemblies. Thus, there is an upper limit to the density of fuel assemblies that can safely be stored in a fuel storage pool of a given size. The regulatory authorities have established a maximum permitted effective reactivity of the rack in order to provide an adequate safety margin. This maximum limit, however, has not been increased in response to the need for storing more assemblies in a given storage area. Therefore, a way must be found to justify storing spent assemblies more closely together without exceeding the reactivity limit.

SUMMARY OF THE INVENTION

The present invention provides an apparatus and method for measuring the subcritical multiplication of individual fuel assemblies so that a more accurate determination of the maximum actual reactivity of the storage rack can be made. Previously the storage racks had to be designed for the most reactive fuel assembly with no burnup that was anticipated for use in the plant. In the preferred embodiment of the invention, a standard assembly having a known subcritical multiplication and corresponding reactivity is measured using the inventive apparatus. Thereafter each spent assembly is measured using the same apparatus, and only those spent assemblies having a lower subcritical multiplication than the standard assembly are placed in the storage rack. Those assemblies having a higher multiplication are stored separately in racks having larger spacing than the standard rack. In this way a direct limit on the reactivity of the standard storage rack can be achieved. The maximum number of spent assemblies that can be stored without exceeding the design limit reactivity can be larger than that permitted by the assumption that the reactivity of each assembly be bared on the highest anticipated enrichment.

The inventive apparatus and method include placing a neutron flux detector in one control rod guide tube of a spent assembly and a neutron source in another guide tube. The subcritical multiplication is measured, and compared with the measurement for the standard assembly. In the preferred embodiment, the detector and source are attached to rods on a movable support member, the arrangement very closely resembling a control element assembly. Since the rods carrying the source and detector are maintained in a constant, spaced apart relation due to the close fit of each rod within a respective rigid guide tube, the distance and angle between the detector and source used in the measurement of the standard fuel assembly can be accurately repeated for measuring each spent assembly.

BRIEF DESCRIPTION OF THE DRAWINGS

These and other advantages and objects of the invention will be evident to those skilled in this field from the detailed description which follows in which.

DESCRIPTION OF THE PREFERRED EMBODIMENT

Figure 1:
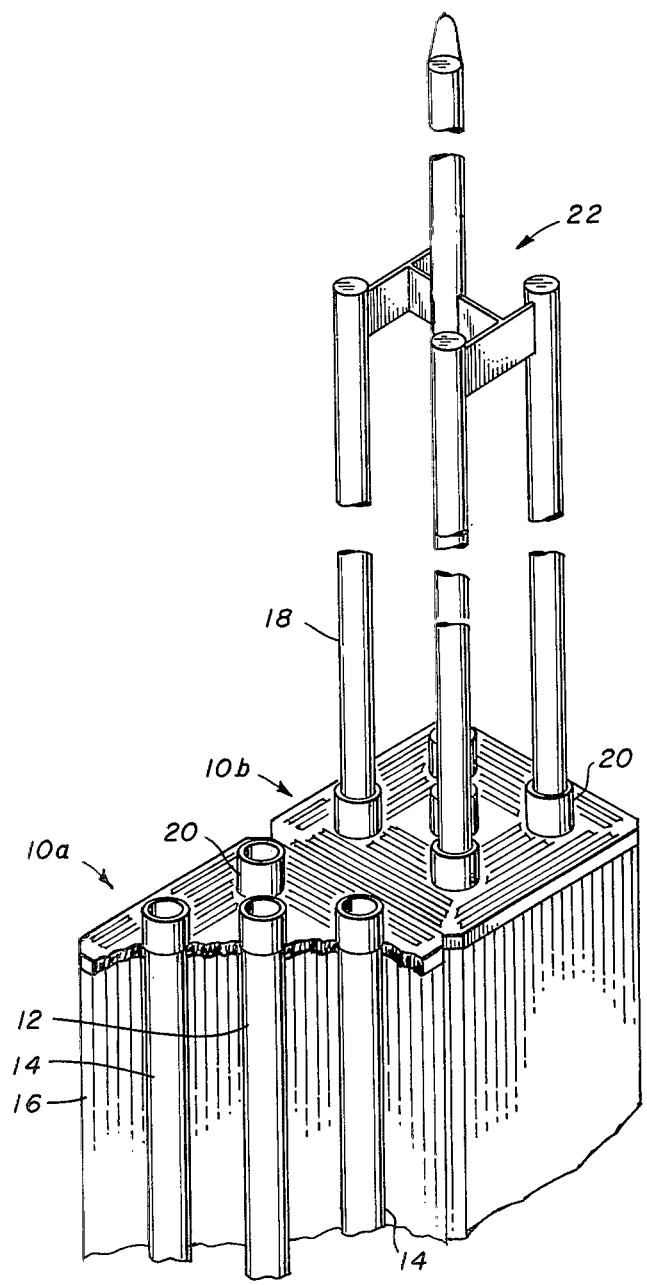
FIG. 1 is a perspective, partially-sectioned view of two nuclear fuel assemblies and an associated control element assembly.

FIG. 1 shows two nuclear fuel assemblies 10a, 10b as they would be arranged in a nuclear reactor core (not shown). Assembly 10a is partly sectioned to show the center guide tube 12 and two of the four outer guide tubes 14 which lie at the corners of a square figuratively superimposed within the assembly. In the typical reactor, every one of the assemblies has an identical array of control rod guide tubes 12,14. The plurality of closely spaced elongated vertical members are the fuel pins 16 which contain the enriched uranium dioxide ($UO_2$) typically used as the fuel material in modern reactors.

Assembly 10b has control elements 18 inserted in each of the guide tubes 14. The guide tubes 12,14 are relatively rigid since they form the structural skeleton of the assembly, and typically extend from below the lower ends of the fuel pins 16 upward beyond the upper end of the fuel pins where a hollow post 20 is rigidly connected to each guide tube 12,14. The control elements 18 are telescopingly movable throughout the full axial extent of the guide tubes 14 and are typically yolked at their upper ends to form a control element assembly 22 which can be driven by any one of a variety of drive mechanisms (not shown).

In a typical embodiment, the fuel assemblies 10a, 10b are about 8 inches square, with each guide tube 12,14 having an inner diameter of about 0.90 inches and a thickness of about 0.04 inches. Each control element 18 has an outer diameter of about 0.82 inches which allows for a slight clearance to prevent the tube from interfering with the free motion of the control element. The outer diameter of the control element 18, however, is usually chosen to be the maximum that will allow uninhibited motion within the respective guide tube 14.

Figure 2:
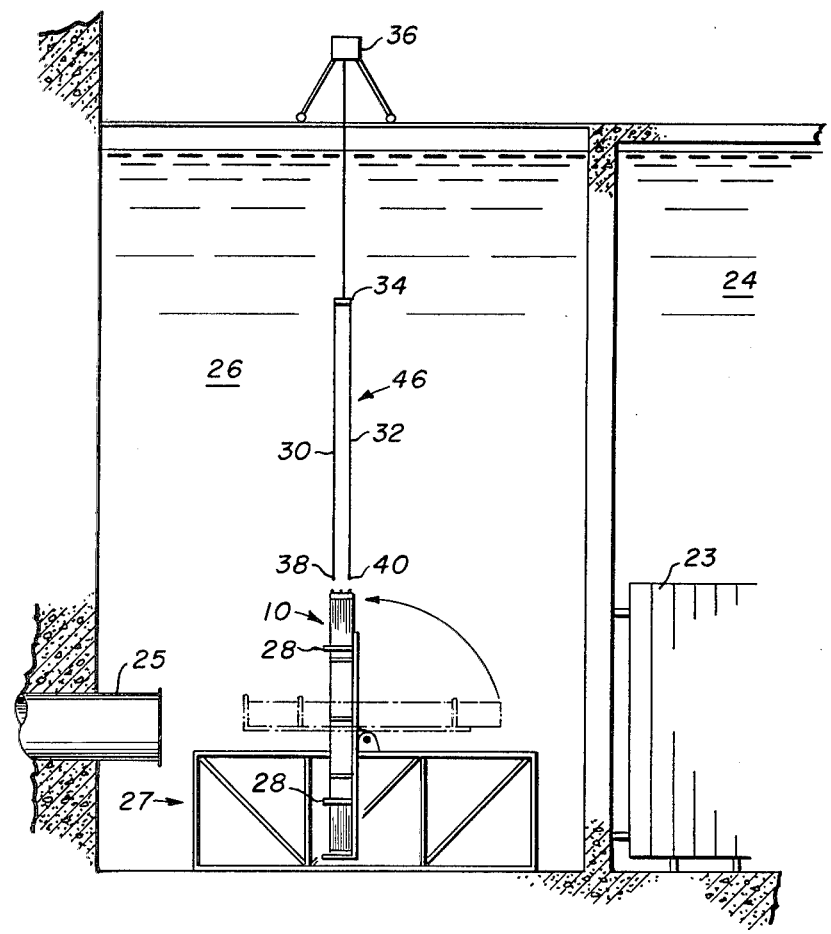
FIG. 2 is a schematic elevation view of a fuel assembly strapped to a transfer machine which carries spent assemblies from the reactor cavity to the transfer canal.

Each fuel assembly 10 typically remains in the reactor core for three cycles, or about three years, before the assembly is permanently removed from the core and temporarily stored in racks 23 located in the spent fuel storage pool 24 as shown in FIG. 2. The pool is typically filled with borated water and isolated from the reactor cavity. Each assembly 10 is individually transported from the reactor cavity through a transfer tube 25 into a transfer canal 26, then picked up by a crane (not shown) and placed in the storage racks 23. One type of storage rack is described in U.S. Pat. No. 4,044,267 "Fissionable Mass Storage Device" issued Aug. 23, 1977, to F. Bevilacqua, hereby incorporated by reference.

The conventional method of determining the maximum storage density of spent assemblies in the racks 23 is to perform calculations using sophisticated computer codes. Currently, the maximum permitted effective reactivity ($K_e$) of the rack, including uncertainties, cannot exceed 0.950. An alternate way of expressing $K_e$ is the subcritical multiplication (SM), conventionally defined as $$SM = 1/(1-K_e)$$

The following are the more important parameters that must be accounted for in the computer calculations:
1. the effective enrichment of the fuel pins
2. the environment of the racks (typically borated water)
3. the nominal spacing between adjacent assemblies
4. the kind and geometry of the structural and absorber material forming the racks
5. uncertainties in the geometry of the rack
6. distortions caused by seismic disturbances
7. uncertainties and bias of the analytical results.

The first item, the effective enrichment, is extremely important yet is usually the least accurately represented parameter in the calculations. Usually, a very conservative, i.e., high, enrichment and zero burnup are assumed for each and every assembly to be stored in the rack. This assumption is often unavoidable because when the rack is designed and manufactured, there is no way of being certain what the effective enrichment of individual assemblies will be when they are discharged from the reactor and placed in the rack. The discharge burnup, hence the effective enrichment and reactivity, depend on such factors as the particular fuel management scheme and the length of time the core is burned before refueling occurs. These can be decided long after the rack has been installed. An additional uncertainty arises from the fact that calculations of the average burnup of individual assemblies are accurate to only within ±10%. The resulting uncertainty in the reactivity of the individual assembly may be as high as 0.03 even when the fuel management scheme and burnup are known as well as possible.

For these reasons the reactivity calculations for the rack are usually made assuming all assemblies have the highest possible individual reactivity, which is that of fresh, or unburned, fuel having an enrichment of about 3.5 weight percent U-235. Since virtually all assemblies are considerably depleted before being discharged from the reactor, and therefore have a significantly lower effective reactivity, this assumption unnecessarily penalizes the designer and prevents the storage of additional assemblies which, with more accurate reactivity accounting, could be stored safely within the license limit of 0.950 on the rack $K_e$.

The present invention permits a much more accurate determination of the maximum $K_e$ of the rack, by increasing the accuracy of the individual assembly reactivity relative to the assembly reactivity used in the rack design calculations. The invention enables the designer to choose an arbitrary assembly $K_e$ for use in the calculation of the $K_e$ of the rack, with the assurance that no assembly ever placed in the rack will violate the assumption. This assurance is achieved by comparing the subcritical multiplication of each spent assembly against the subcritical multiplication of a standard assembly having an accurately known $K_e$ equal to the maximum assembly $K_e$ used in the rack design calculation. Any spent assembly exceeding this maximum is not placed in the standard rack.

Before proceeding with a more detailed description of the invention, it should be appreciated that an accurate measurement of a threshold reactivity is not a simple matter when performed in the environment in which the present invention will be used. The present invention must quickly and accurately compare the reactivities of approximately three assemblies per hour with a known standard, in a nonlaboratory environment while the spent assemblies are being transferred from the reactor cavity to the fuel pool.

Referring again to FIG. 2, there is shown part of a fuel assembly transfer machine 27 which transports individual assemblies 10 from the area above the reactor vessel, through the transfer tube 25, to the canal 26. The details of one such machine are described in U.S. Pat. No. 4,069,766 "Fuel Transfer Machine" issued Jan. 24, 1978, to Irving Bernstein hereby incorporated by reference. For the purpose of this disclosure, all that need be understood about the transfer machine 27 is that every assembly is individually handled on its way to the fuel pool 24 such that it can be rigidly supported in a unique location and orientation that isolates the assembly from extraneous radiation sources. As shown in FIG. 2, the most convenient such point occurs when the assembly 10 is supported in a vertical orientation by straps 28 immediately after the assembly has been rotated in the transfer machine 27.

Figures 3, 4:
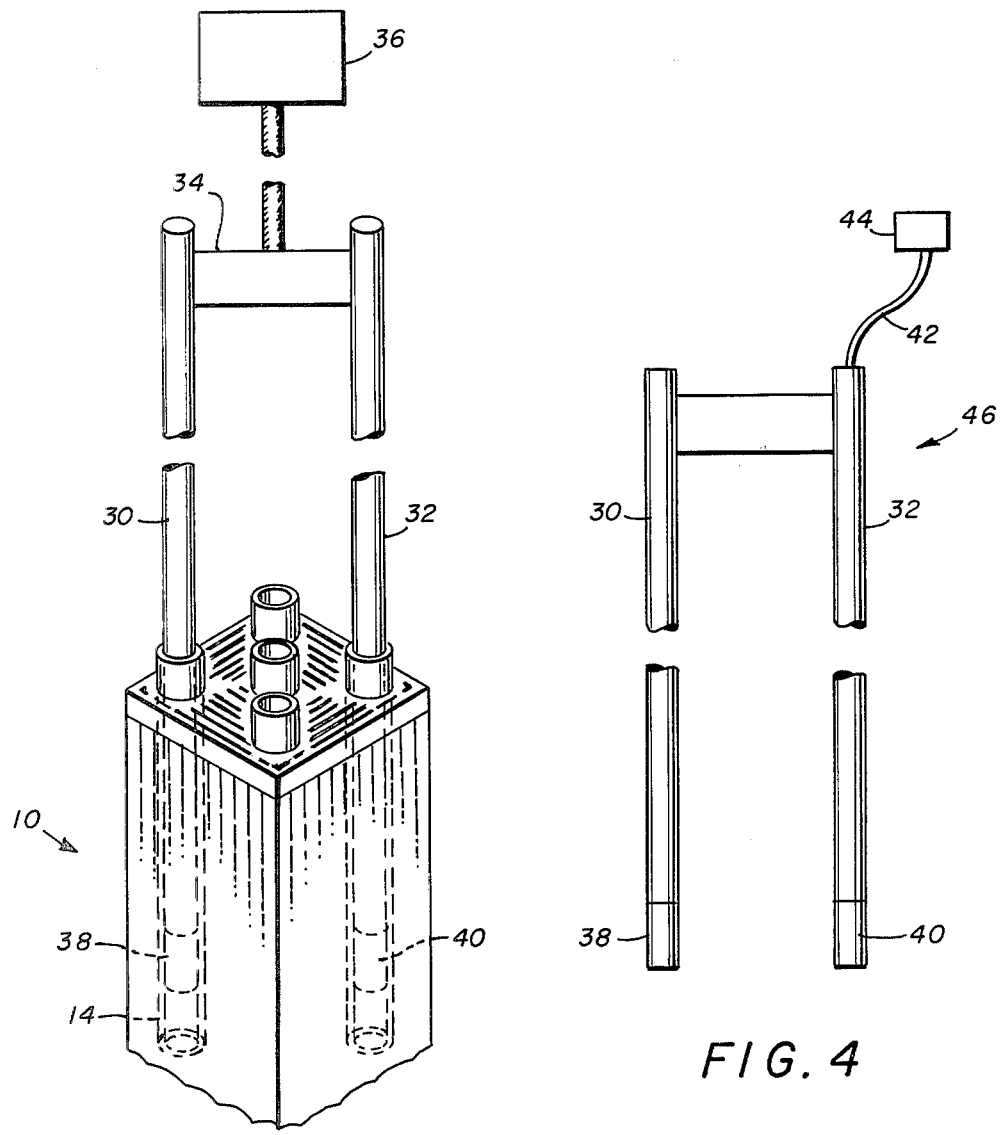
FIG. 3 is a schematic of the inventive measuring device inserted in a spent fuel assembly.
FIG. 4 is a schematic of the inventive measuring device.

In FIG. 3, the assembly 10 is shown schematically with two of the five guide tubes 14 shown in phantom. The assembly 10 is typically on the order of 15 feet long, but for simplicity only the upper portion is represented. At the point in the fuel transfer route where the threshold multiplication measurement is to be made, as shown in FIG. 2, two rods 30,32 are insertable into respective guide tubes 14, each rod 30,32 being adapted to reciprocate therein. In the preferred embodiment, the rods 30,32 are long enough for the lower tips thereof to translate through the tubes over the full length of the assembly. The rods 30,32 are preferably attached near their tops to a common support member 34 which can be vertically reciprocated either manually or by a drive means represented generally by 36.

As shown in FIGS. 3 and 4, the first rod 30, hereinafter referred to as the source rod, has attached thereto a neutron source 38 such as antimony-beryllium (Sb-Be), having a known strength typically on the order of $10^8$ neutrons per second. The second rod 32, hereinafter referred to as the detector rod, has attached thereto a neutron detector 40 such as a conventional fission chamber having a sensitivity of about $10^{-3}$ counts per neutron/centimeters$^2$-second. When the source 38 and detector 40 are within the spent assembly 10, it is important that the elevation of the detector 40 relative to the source 38 be known and reproducible. In the preferred embodiment, the rigid connection of the rods 30,32 to the support member 34 provides a fixed vertical relation between the source 38 and detector 40, this relation preferably being on the same horizontal plane. The electrical leads 42 from the detector 40 to the conventional readout circuitry 44 preferably pass upward through the detector rod 32 to avoid interferring with the movement of the rod 32 through the tube 14.

The preferred method of screening the spent assemblies to avoid placing any assembly having a reactivity greater than that assumed in the storage rack calculations, will be described with reference to FIGS. 2, 3, and 4. A standard assembly (not shown) having uniformly enriched fuel pins and the same guide tube array as the spent fuel 10 is precalculated or measured in the laboratory to establish as accurately as possible its effective reactivity $K_e$ in an environment similar to that existing in the transfer canal where the spent assemblies are to be measured. The standard assembly is then delivered to the power plant where it is secured to the transfer machine 27 as if it were a spent assembly 10. The measuring device 46 is inserted into two guide tubes 14, preferably in the diagonally opposite corners of the assembly. The thermal flux measured by the detector 40 in the standard assembly is noted, and preferably is recorded at several different axial positions on the assembly. For the source 38 and detector 40 described above, the generated count rate will be about $10^3$ counts per second. Since the $K_e$ of the standard assembly is accurately known, (typically designed to be about 0.90), the SM can be easily calculated from the definition given above. It should be appreciated that if the standard assembly did not provide any multiplication, the detector 40 would generate about $10^{-1}$ counts per second.

For a given fuel assembly, the SM has been found to be proportional to the thermal neutron flux measured by the detector 40, and is believed to be nearly proportional to the flux even between fuel assemblies having different isotopic contents. For example, let $F^i(s)$ be the initial thermal flux measured with device 46 in the standard assembly (s) per unit source neutron. The corresponding $SM^i(s)$ and $K_e^i(s)$ are known from the standardization calculation or laboratory measurement made on the standard fuel assembly. If the standard fuel assembly were burned to a final spent fuel condition and then the final flux $F^f(s)$ measured with the device 46, the ratio $F^f(s)/F^i(s)$ would enable one to obtain $$SM^f(s) = SM^i(s) \times F^f(s)/F^i(s)$$

Then from the definition of SM, the effective reactivity $K_e^f(s)$ of the standard assembly in its final, spent condition can be obtained. Although in the practice of the present invention the standard assembly is not actually depleted, the foregoing logic is used to infer $K_e^f(b)$, the effective multiplication factor of each burned or spent assembly. This insures that a spent assembly having a $K_e^f(b)$ equal to or greater than the $K_e^{(s)}$ of the standard assembly is not placed in the fuel storage rack. This is achieved by assuring that no spent assembly placed in the rack has a subcritical multiplication, $SM^f(b)$, greater than the subcritical multiplication of the standard assembly, SM(s). Thus the acceptability condition can be expressed as $$SM^f(b) < SM(s)$$
$$SM(S) \times \frac{F^f(b)}{F(s)} < SM(s)$$

-continued therefore $F^f(b) < F(s)$ which permits a quick acceptance decision because $F^f(b)$ is a directly measured quantity and can be displayed on the output circuitry 44. In the event $F^f(b)$ for any assembly is larger than $F(s)$, the offending fuel assembly may be stored in a small rack having larger spacing between assemblies than exists in the standard rack 23. In the preferred method, several measurements of $F^f(b)$ are made at different axial locations on each spent assembly and the largest value is compared with the standard $F(s)$.

Two features of the preferred embodiment of the invention will be discussed in more detail because they promote increased accuracy in the method. First, the assumption that the SM of one assembly relative to another is proportional to the detected thermal flux per unit source neutron, independent of the isotopic compositions of the assemblies, has been justified to the extent necessary to make the present invention a significant improvement over the conventional fuel rack design method. This accuracy could be further improved by using as the standard assembly a spent assembly having the isotopic composition represented by a typically burned assembly having the maximum $K_e$ allowed for the particular fuel storage racks. This burnup might be on the order of about 20,000 megawatt days per ton of uranium metal.

Secondly, it is noted that the above proportionality assumption is greatly weakened if the detector and source separation distance cannot be accurately repeated for each measurement. It has been calculated, for example, that a one-eight inch change in distance between source 38 and detector 40 when measuring the same assembly can produce an error in the inferred $K_e$ on the order of 0.03. This is a large uncertainty, comparable in magnitude to the improvement the present invention has made in the accuracy of $K_e$ relative to the conventional methods. The use of source and detector rods 30,32 each having outer dimensions substantially equal to those of the regular control rod elements 18 (FIG. 1), assures a close fit into the respective guide tubes 14 and repeated accuracy of the separation distance or angle.

It should be understood that the method of the present invention can be implemented with devices different from that described in the preferred embodiment. For example, other sources and detectors having higher neutron energy could be used. Accordingly, the present disclosure should be read in an illustrative rather than limiting sense.

We claim:

1. An apparatus for sequentially comparing the subcritical multiplication of a plurality of nuclear fuel assemblies having an identical array of at least two longitudinally extending, spaced apart, hollow tubes contained within the assembly, comprising:
   a first rod adapted to reciprocate within a first tube of an assembly;
   a second rod adapted to reciprocate within a specific second tube of the assembly;
   a neutron source fixedly positioned relative to the first rod and movable therewith into the first tube;
   a neutron flux detector fixedly positioned relative to the second rod and movable therewith into the second tube;

means for accurately fixing the elevation of the detector relative to the source when the detector and source are within the same assembly; and means for receiving the output signal of the detector and for converting the output signal to a flux measurement.

2. The apparatus of claim 1 wherein the detector is primarily sensitive to a thermal neutron flux.

3. The apparatus of claim 1 wherein the first and second rods are attached near their tops to a vertically reciprocable common support member.

4. The apparatus of claim 3 wherein the means for receiving the output signal includes detector leads running longitudinally through at least part of the second rod.

5. The apparatus of claim 3 wherein the neutron source and the flux detector are at the same elevation on their respective rods.

6. The combination comprising:
   a nuclear fuel assembly containing therein an array of longitudinally extending, spaced apart, hollow tubes at least two of which are adapted to telescopingly receive individual elements of a control element assembly;
   a first rod having outer dimensions substantially equal to those of a single control element;
   a second rod having outer dimensions substantially equal to those of a single control element;
   a neutron source fixedly attached to the first rod;
   a neutron flux detector fixedly attached to the second rod;
   means for positioning the first and second rods into selected first and second tubes such that the source and detector are at selected relative elevations within the respective tubes; and
   means for receiving the output signal from the detector and for converting the output signal to a remote flux measurement.

7. A method for comparing the subcritical multiplication factor between two movable nuclear fuel assemblies containing therein an identical array of at least two longitudinally extending, spaced apart hollow tubes, comprising the steps of:
   (a) supporting a first assembly such that the assembly is in a unique location and orientation with respect to the surrounding environment;
   (b) inserting a neutron source to a predetermined position within a first tube of the assembly;
   (c) inserting a neutron flux detector to a predetermined position within a selected second tube of the assembly;
   (d) remotely measuring the output signal from the detector;
   (e) removing the source and detector from the first assembly;
   (f) removing the first assembly from the unique location;
   (g) supporting a second assembly in the unique location and orientation of step (a);
   (h) repeating steps (b) through (d);
   (i) comparing the measurements from the first and second assemblies.

8. A method for loading nuclear fuel assemblies from a transfer area into a standard storage area where the effective reactivity of each stored assembly may not exceed that of a standard assembly having a known effective reactivity and subcritical multiplication, and wherein each assembly and the standard assembly contain therein an identical array of longitudinally extending, spaced apart, hollow tubes, comprising the steps of:
   (a) supporting the standard assembly in a unique location and orientation in the transfer area;
   (b) inserting a neutron source to a predetermined position within a first tube of the standard assembly;
   (c) inserting a neutron flux detector to a predetermined position within a selected second tube of the standard assembly;
   (d) obtaining a standard output measurement from the detector commensurate to the subcritical multiplication of the standard assembly;
   (e) removing the source and detector from the standard assembly;
   (f) removing the standard assembly from the unique location;
   (g) supporting in said unique location and orientation one of the assemblies to be loaded into the storage area;
   (h) inserting the neutron source to the predetermined position within said one assembly;
   (i) inserting the neutron flux detector to the predetermined position within said selected second tube of said one assembly;
   (j) obtaining an output measurement from the detector commensurate to the subcritical multiplication of said one assembly;
   (k) removing the source and detector from said one assembly;
   (l) loading said one assembly into the standard storage area only if the measurement of step (j) does not exceed the measurement of step (d);
   (m) repeating steps (g) through (l) for the remainder of the assemblies.

9. The method of claim 8 wherein steps (d) and (j) are performed when the detector and source are at the same elevation in the standard and said one fuel assembly, respectively.

10. The method of claim 8 wherein steps (h), (i), and (j) are repeated at several elevations within said one assembly, and wherein the largest of the repeated measurements from step (j) is used in step (l).

* * * * *